(12) United States Patent
Vulich et al.

(10) Patent No.: US 7,090,559 B2
(45) Date of Patent: Aug. 15, 2006

(54) OPHTHALMIC LENS MANUFACTURING SYSTEM

(75) Inventors: Matthew Vulich, LaGrange, IL (US); Bhaven Patel, Mahwah, NJ (US); Santiago Albert, Teia (ES)

(73) Assignee: AIT Industries Co., Bensenville, IL (US)

( * ) Notice: Subject to any disclaimer, the term of this patent is extended or adjusted under 35 U.S.C. 154(b) by 256 days.

(21) Appl. No.: 10/718,174

(22) Filed: Nov. 19, 2003

(65) Prior Publication Data

US 2005/0106999 A1    May 19, 2005

(51) Int. Cl.
B49D 1/00 (2006.01)

(52) U.S. Cl. ............... 451/5; 451/8; 451/9; 451/10; 451/42; 451/43; 451/44; 451/364; 451/388; 451/390

(58) Field of Classification Search ............... 451/6, 451/8, 9, 10, 42, 43, 44, 364, 388, 390
See application file for complete search history.

(56) References Cited

U.S. PATENT DOCUMENTS

| | | | |
|---|---|---|---|
| 4,115,924 A | 9/1978 | Kleinkopf | |
| 4,562,671 A * | 1/1986 | Bouillon et al. | 451/388 |
| 4,711,035 A | 12/1987 | Logan et al. | |
| 4,715,147 A | 12/1987 | Millay et al. | |
| 5,425,665 A | 6/1995 | Kennedy | |
| 5,457,868 A | 10/1995 | Blaimschein | |
| 5,462,475 A | 10/1995 | Kennedy | |
| 5,498,200 A | 3/1996 | Werner | |
| 5,528,878 A | 6/1996 | Edwards et al. | |
| 5,626,511 A | 5/1997 | Kennedy et al. | |
| 5,716,256 A | 2/1998 | Mizuno et al. | |
| 5,720,647 A | 2/1998 | Gottschald | |
| 5,727,987 A | 3/1998 | Gottschlad | |
| 5,803,793 A | 9/1998 | Mizuno et al. | |
| 5,882,247 A | 3/1999 | Longuet et al. | |
| 5,890,949 A | 4/1999 | Shibata | |
| 5,919,080 A | 7/1999 | Savoie | |
| 6,012,965 A * | 1/2000 | Savoie | 451/6 |
| 6,045,432 A | 4/2000 | Shibata | |
| 6,048,258 A | 4/2000 | Shibata | |
| 6,050,877 A | 4/2000 | Shibata et al. | |

(Continued)

OTHER PUBLICATIONS

Going Digital in the Laboratory by William Underwood, ABOM, Copyright 2002, First Vision Media Group, Inc.

*Primary Examiner*—Joseph J. Hail, III
*Assistant Examiner*—Shantese L. McDonald
(74) *Attorney, Agent, or Firm*—Mayer, Brown, Rowe & Maw LLP (57) ABSTRACT

A tool for gripping ophthalmic lenses including a vacuum gripper, a shaft associated with said vacuum gripper, the shaft having two ends and being slidably attached at one end thereof to a support structure, a resilient member which biases the vacuum gripper in a direction away from said support structure and a locking member which locks the shaft in a desired position during a lens gripping operation.

Another embodiment of the present invention includes a lens hold down mechanism for holding lenses in a lens tray.

Another embodiment of the present invention includes an electronic communications scheme for a robotic manufacturing operation.

Another embodiment of the present invention includes an ophthalmic lens manufacturing cell layout wherein ophthalmic edging machines have an opening that faces away from a robotic arm.

Another embodiment of the present invention includes an arrangement for holding an ophthalmic edging machine within an ophthalmic manufacturing cell.

16 Claims, 7 Drawing Sheets

U.S. PATENT DOCUMENTS

| | | |
|---|---|---|
| 6,056,633 A | 5/2000 | Sesena et al. |
| 6,059,635 A | 5/2000 | Mizuno |
| 6,074,280 A | 6/2000 | Mizuno et al. |
| 6,080,044 A | 6/2000 | Lanham et al. |
| 6,089,957 A | 7/2000 | Shibata |
| 6,095,896 A | 8/2000 | Kobayashi |
| 6,099,383 A | 8/2000 | Mizuno et al. |
| 6,123,604 A | 9/2000 | Mizuno et al. |
| 6,159,072 A | 12/2000 | Shibata |
| 6,203,409 B1 | 3/2001 | Kennedy et al. |
| 6,220,926 B1 | 4/2001 | Mizuno |
| 6,220,927 B1 | 4/2001 | Mizuno et al. |
| 6,220,929 B1 | 4/2001 | Mizuno |
| 6,222,624 B1 | 4/2001 | Yonezawa |
| 6,241,577 B1 | 6/2001 | Shibata |
| 6,243,960 B1 | 6/2001 | Andrews |
| 6,250,989 B1 | 6/2001 | Mizuno |
| 6,257,968 B1 | 7/2001 | Carey et al. |
| 6,261,150 B1 | 7/2001 | Mizuno et al. |
| 6,263,583 B1 | 7/2001 | Mizuno et al. |
| 6,283,826 B1 | 9/2001 | Mizuno |
| 6,290,569 B1 | 9/2001 | Mizuno et al. |
| 6,298,277 B1 | 10/2001 | Videocoq |
| 6,315,642 B1 | 11/2001 | Videocoq et al. |
| 6,325,700 B1 | 12/2001 | Mizuno et al. |
| 6,328,628 B1 | 12/2001 | Mizuno et al. |
| 6,336,057 B1 * | 1/2002 | Obayashi .................... 700/164 |
| 6,350,190 B1 | 2/2002 | Matsuyama |
| 6,375,554 B1 | 4/2002 | Murray et al. |
| 6,379,215 B1 | 4/2002 | Mizuno et al. |
| 6,390,887 B1 * | 5/2002 | Ulloa ........................... 451/8 |
| 6,409,574 B1 | 6/2002 | Shibata |
| 6,427,094 B1 | 7/2002 | Mizuno et al. |
| 6,427,350 B1 | 8/2002 | Asaoka et al. |
| 6,428,301 B1 | 8/2002 | Fukuma et al. |
| 6,428,401 B1 | 8/2002 | Carey et al. |
| 6,464,559 B1 | 10/2002 | Roberts et al. |
| 6,478,658 B1 | 11/2002 | Logan |
| 6,481,095 B1 | 11/2002 | Mizuno |
| 6,497,614 B1 | 12/2002 | Kobayashi et al. |
| 6,538,573 B1 | 3/2003 | Mizuno |
| 6,547,642 B1 | 4/2003 | Hatano |
| 6,588,898 B1 | 7/2003 | Iwai et al. |
| 6,606,154 B1 | 8/2003 | Oda |
| 6,618,952 B1 | 9/2003 | Andrews et al. |
| 6,621,568 B1 | 9/2003 | Yonezawa |
| 2001/0003083 A1 | 6/2001 | Roberts et al. |

* cited by examiner

OPHTHALMIC LENS MANUFACTURING SYSTEM

FIELD OF INVENTION

This invention relates generally to an ophthalmic lens manufacturing system, and more particularly to a lens manufacturing system wherein one or more robotic arms communicates with a plurality of lens edgers in a robotic manufacturing cell.

BACKGROUND OF INVENTION

Modern ophthalmic lens processing systems comprise three main components: a robotic arm, a plurality of edging machines, and a host lab server to control the lens manufacturing operation. The robotic arm, the edging machines and the host lab server form what is known as a ophthalmic lens manufacturing "cell". Typically, lenses arrive at the cell in trays which hold the lenses in a position such that their convex side is facing up. These trays are picked up by a robotic arm and brought to an edging machine, whereby the lenses are removed from the tray with the robotic arm and placed in the edging machine. When the edging operation is complete, the lenses are placed back in the tray and returned to a location outside of the cell for further processing and placement into lens frames.

The current manufacturing cells are deficient in several respects. First, while some robotic arms use suction cups connected to a vacuum source to lift the lenses from the tray, these suction cups are not of a compliant nature and cannot automatically adjust themselves depending on the thickness and/or curvature of a particular lens. Because of the dimensional limitations of the interior of an edging machine, the lack of a compliant pickup mechanism on a robotic arm prevents thicker lenses from being used with a robotic lens manufacturing cell, thus requiring manual labor to perform or assist with the edging process. Also, not having a complaint gripper mechanism increases the likelihood that a lens will be dropped by the robotic arm, which leads to lowered productivity. Thus there is a need for a compliant gripper mechanism that will accommodate various lenses through a compliant pick up mechanism.

Second, a typical manufacturing cell will have a robotic arm placed in the center of a plurality of lens edging machines. The openings of these machines are faced toward the robotic arm to provide easy access to the edgers by the robotic arm. However, if a lens becomes jammed within an edger, or if an edger requires maintenance, the inward-facing nature of the edging machines makes un-jamming the machine or performing maintenance on the machine a burdensome and time-consuming task. Thus, there is a need for a ophthalmic lens robotic manufacturing cell that will provide easy access to the edgers while maintaining an efficient manufacturing operation.

Third, because individual edging machines need to be replaced or serviced from time to time, it is necessary to remove edgers from the manufacturing cell periodically. However, heretofore, the removal of an edger has been a complicated task. Accordingly, there is a need for a simplified arrangement of holding an edger in place within a manufacturing cell that will allow for easier removal of the edging machine.

Fourth, due to the speed in which the robotic arm in an ophthalmic lens manufacturing cell moves, it is somewhat common that the lenses contained in the tray will periodically move out of their preset locations within the tray, which prevents the robotic arm from subsequently picking up the lens and placing it in an edging machine. Under such circumstances, the manufacturing cell, or a portion thereof, must be taken off line so that a human operator can reset the lenses in the tray and continue with the automated manufacturing process. Thus, there is a need for an ophthalmic lens manufacturing system that will lessen the chances that a lens will move out of its preset location within a tray.

Fifth, typically a host lab server will communicate with a robotic arm and the robotic arm will communicate with the edgers. This arrangement is not very efficient because allocating time for communication of a robot directly to the lab server which, in turn, must communicate the complete data regarding the particular ophthalmic lens to be manufactured (or edged) to each individual edger results in a greater total time of communication, thus resulting in lower throughput (i.e., capacity) of the manufacturing cell. Thus there is a need for a more efficient communication scheme between a host lab server, a robotic arm and an edging machine.

These and other needs will become more apparent upon a review of the specification, drawings and claims, set forth below.

SUMMARY OF THE INVENTION

One embodiment of the invention comprises a tool for gripping ophthalmic lenses having at least one gripper, a shaft associated with said gripper, the shaft having two ends and being slidably attached at one end thereof to a support structure, a resilient member which biases the gripper in a direction away from said support structure and a locking member which locks the shaft in a desired position during a lens gripping operation.

Another embodiment of the present invention includes a lens hold down mechanism having a support member, at least one shaft slidably connected to said support member, a resilient member which biases said shaft in a downward direction, a lens contact member attached to said shaft and a robotic arm connected to said support member, wherein when said robot moves in a downward direction to pick up a lens tray, said lens contact member will contact lenses in said tray and cause said shaft to move upwardly with respect to said support member, and wherein said resilient member maintains a pressure on said lens in said lens tray.

Another embodiment of the present invention includes an electronic communications scheme having a server, a robotic arm, and a device, wherein said server communicates with said device through a first communications port on said device and wherein said device communicates with said robotic arm through a second communications port.

Another embodiment of the present invention includes an ophthalmic lens manufacturing cell layout having a robotic arm, and a plurality of ophthalmic edging machines, wherein said ophthalmic edging machines have an opening that faces away from said robotic arm.

Another embodiment of the present invention includes an arrangement for holding an ophthalmic edging machine within an ophthalmic manufacturing cell having an ophthalmic edging machine, at least two rails, wherein said edging machine includes a bracket that engages said rails, and a locking mechanism, wherein said locking mechanism holds said ophthalmic edgning machine in a desired position along said rails.

DETAILED DESCRIPTION OF THE PREFERRED EMBODIMENT

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

Figure 1:
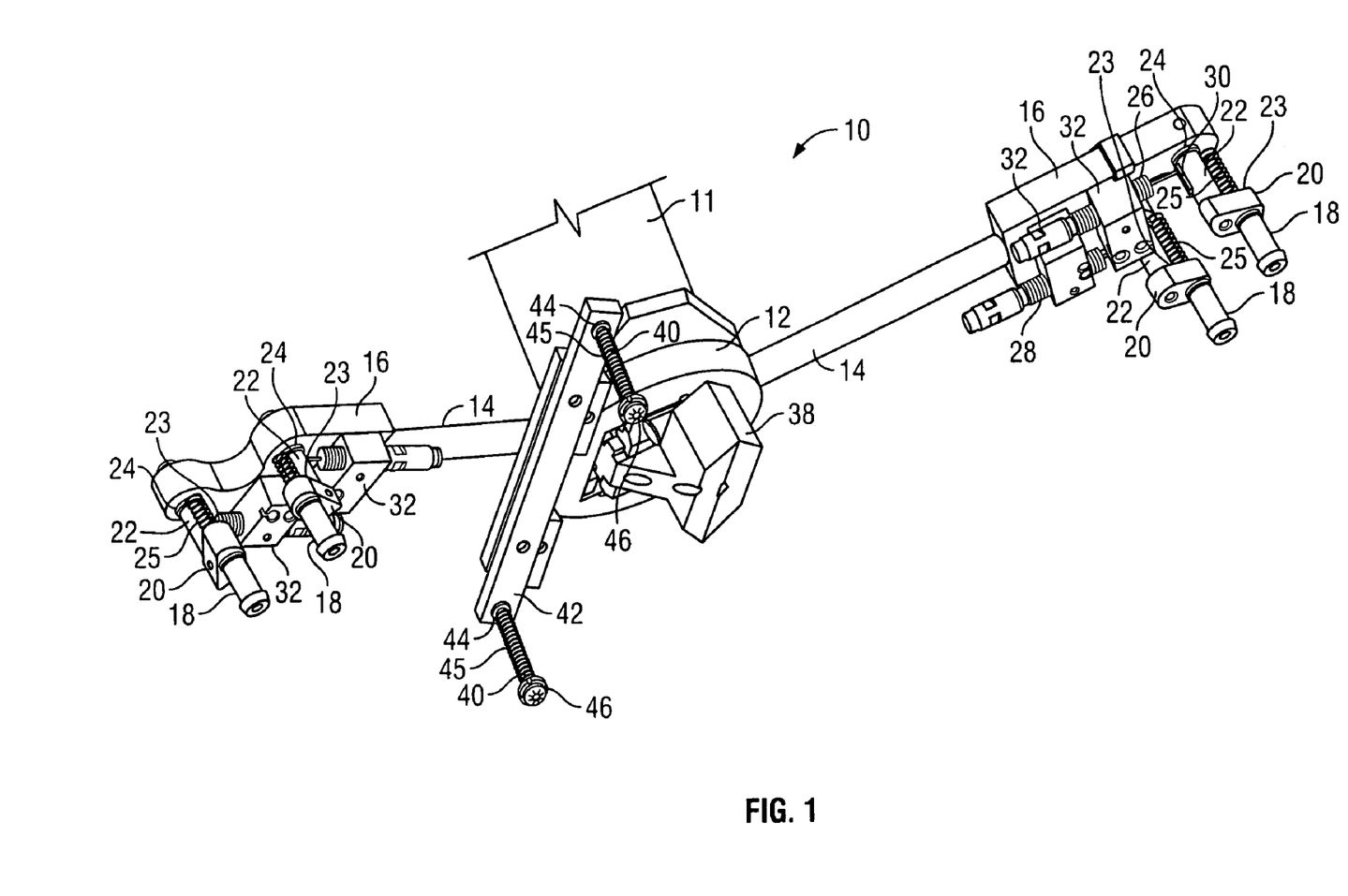
FIG. 1 is a perspective view of one embodiment of a robotic lens gripper tool in accordance with the principles of the present invention.

With reference to FIG. 1, one embodiment of the present invention contains a gripper tool 10, which is attached to the working end of a commercially available robotic arm 11. It is preferred that one embodiment of the present invention be used with a six axis robotic arm to allow for greater versatility, but those with skill in the art will recognize that robots having a lesser or greater number of axes can be used in the practice of the present invention. A six axis robotic arm which can be used with one embodiment of the present invention is a robotic arm manufactured by Adept (model number A600).

Figure 2:
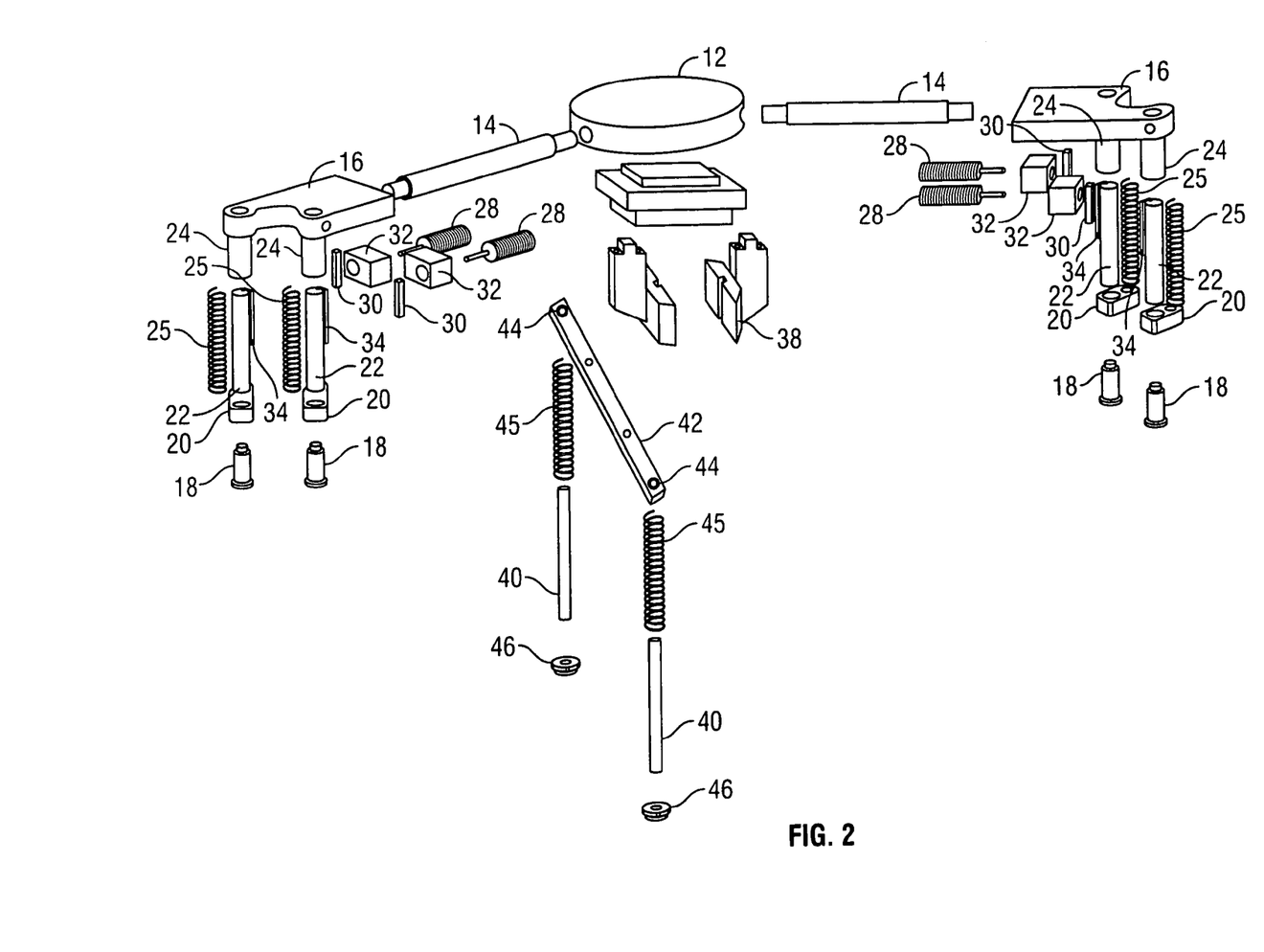
FIG. 2 is an exploded view of the lens gripper tool in FIG. 1.

The gripper tool 10 includes a circular base 12 and a set of extension arms 14. Each of the extension arms 14 is connected to a vacuum gripper base plate 16, which contains a plurality of vacuum grippers 18, which are connected to connector plates 20. It is preferred that the vacuum grippers have a diameter in the range of 0.35 to 0.63" and most preferably 0.43" and are preferably of the type commercially available from PIAB under part numbers B8-2 to B15MF and most preferably part number B10-2. However, it will be noted that vacuum grippers of other diameters and from other manufacturers can be used in the practice of the present invention. It will also be noted that any other suitable type of gripper mechanism can be used with one embodiment of the present invention. Thus, for instance, non-vacuum suction cups with release mechanisms can be used with one embodiment of the present invention. Connector plate 20 is fixedly attached to shaft 22 and the longitudinal axis of the shaft 22 and the longitudinal axis of the vacuum gripper 18 are offset. This offset is primarily for two reasons. First, the offset keeps the gripper base plate 16 from colliding with a moving chuck within an edger when the robotic arm is handling lenses inside of an edger. Second, the offset allows vacuum tubing 23 to be attached to the vacuum grippers 18 without interference from the shaft 22. Shaft 22 is slideably connected to gripper base plate 16 and slides within a bearing assembly 24. In order to bias the vacuum grippers 18 and connector plates 20 in a downward direction, each vacuum gripper 18 and connector plate 20 has springs 25 associated therewith. It is preferred that the springs are 1" long, with a 0.25" outer diameter and a 0.185" inner diameter and have a spring constant of about 3–5 lbs/in. Those with skill in the art will recognize, however, that other springs with different properties can be used in the practice of one embodiment of the present invention. Also, those with skill in the art will recognize that other resilient members can be used in place of the springs, such as resilient foam, rubber, opposing magnets, etc. Each spring 25 is connected between the connector plate 20 and the gripper base plate 16. It is preferred that the connector plate have a circular recess (not shown) on the top side thereof which is the same diameter of the springs 25 to accommodate and hold the springs 25 in the connector plate. It is also preferred that the springs 25 be attached to the gripper base plate via use of a caulk or epoxy. However, any other means of attaching the springs, such as through pins, welds, glue, recesses, etc., can be used with the practice of one embodiment of the present invention. The arrangement of having each vacuum gripper independently movable and biased in a downward direction provides a compliant pick-up mechanism that assists the robotic arm in picking up lenses of various dimensions and thicknesses.

When the robotic arm picks up a lens, it will position the gripper tool 10 above a tray containing the lenses and lower the tool 10 to a predetermined height above the tray. As the vacuum grippers 18 come into contact with the convex surface of the lens, the shafts 22 associated with each vacuum gripper 18 will independently move within bearing assembly 24 until the robotic arm has competed its downward movement. Because the springs 25 would return the vacuum grippers 18 and their associated shafts 22 back to their fully extended positions once the robot arm begins to lift the lenses out of the tray to place them in an edging machine, locking members 26 are provided. Each locking member 26 comprises a pneumatic cylinder 28 connected to a friction pad 30. The pneumatic cylinder is connected to the vacuum gripper base plate 16 via locking member connectors 32. The friction pad 30 is preferably made out of rubber of about 60 durometer. However, those with skill in the art will recognize that other materials and grades of rubber can be used as the friction pad 30. The friction pad 30 engages with a knurled flat section 34 which is pressed into U-shaped grooves machined into the shafts 22. As can be appreciated, the bearing through which the shaft passes must be able to accommodate the knurled flat section 34. In a preferred embodiment, accordingly, an open faced bearing is used as bearing 24. The friction pad uses approximately 7 to 9 pounds of force to retain the vacuum grippers and shafts 22 in a desired position during lens processing. It will be noted that lesser or greater amounts of pressure can be applied with the friction pad in practicing one embodiment of the present invention.

The gripper tool 10 also contains lens tray pick-up jaws 38, which are pneumatically operated. It will be appreciated, however, that the pick-up jaws, as well as the locking members 26, can be actuated by any other known means of applying a force, such as hydraulics, electric motors, electromagnets, solenoids, etc. The geometry of the pick-up jaws 38 is designed to pick up a vertically extending tab from a lens tray (not shown). However, the geometry of the pick-up jaws 38 can be of any shape needed to perform whatever is the required gripping function. Because lenses, and in particular thicker lenses, may have a tendency to come out of position within the lens tray during transport with a robotic arm, one embodiment of the present invention provides lens hold down shafts 40. These shafts are slidably connected to support bar 42 via a bearing assembly 44. Radially outside of the shafts 40 are springs 45, which are preferably 1.625" long with a 0.374" outer diameter and a 0.3310" inner diameter and a spring constant of 1–3 lbs/in. It will be noted that springs having other characteristics and properties can be used, however. Springs 45 extend between support bar 42 and lens contact members 46 and act to bias the shafts 40 and lens contact members 46 in a downward direction. Lens contact members are made of any material, such as rubber, which will not scratch or mar the lenses during processing. As can be appreciated, when the gripper tool 10 moves in a downward direction to pick up a lens tray, the lens contact members 46 will contact the convex surfaces of the lenses in the tray and cause the shafts 40 to move upwards within bearing assembly 44, thereby compressing springs 45 and providing a hold down force during tray transport. When the tray is released, the springs 45 will cause the shafts 40 and the lens contacting member 46 to return to their original position.

Figure 3:
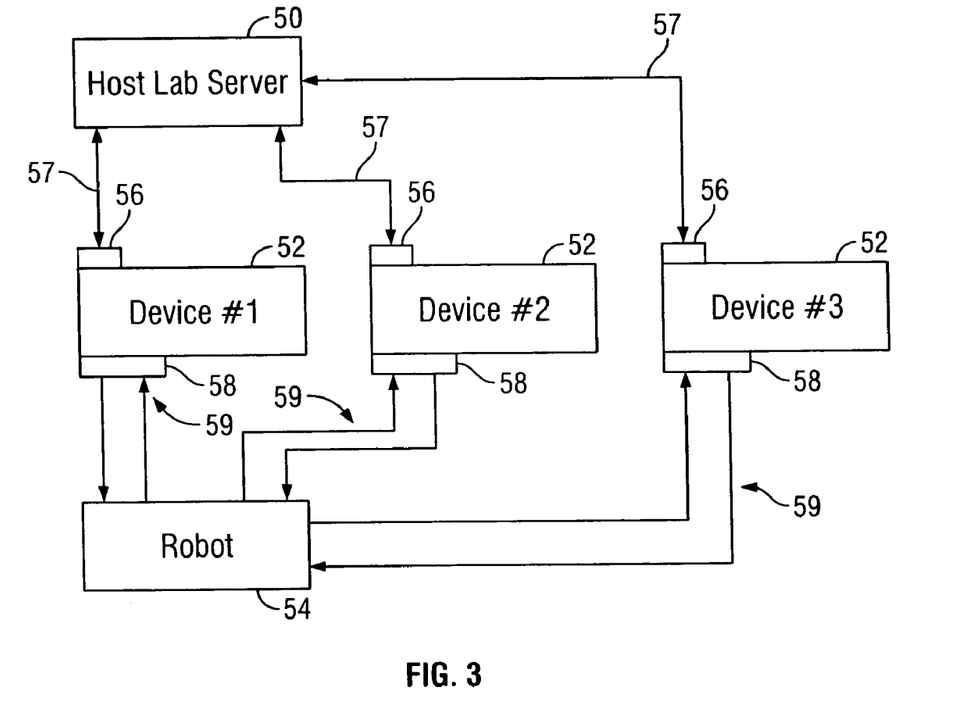
FIG. 3 is a schematic view of an ophthalmic lens manufacturing cell communications scheme.

Another embodiment of the present invention provides an ophthalmic lens manufacturing cell communications scheme that allows for greater efficiency and productivity. As seen in FIG. 3, the ophthalmic lens manufacturing cell of one embodiment of the present invention contains a host lab server 50, a plurality of edging machines 52 and a robotic arm 54. Each edger has first and second communication ports 56 and 58. First communication port uses a RS 232 channel and second communication port uses a RS 485 channel. The host lab server communicates directly with the first communication port 56 of edging machines 52 via (two-way) communication lines 57. It will be noted, however, that any other type of communication means can be used with the present invention, for instance Ethernet connections, serial connections, parallel connections, USB connections, etc. The host lab server provides instructions to the edgers, such as the type of material edged (i.e., glass, plastic, polycarbonate, hi-index and other optional materials) polished or non-polished edge, type of bevel, position of bevel, type of safety bevel, and special options such as grooving. These communications are preferably provided through the VCA communications standard. Each edger, in turn, communicates directly with the robotic arm via communication port 58 and (two-way) communication lines 59, providing instructions such as requesting the robotic arm to remove a lens from an edger when an edging operation is complete, indicating that an edger is ready to accept a new lens for processing, indicating that an edger is working, ready to be loaded or unloaded, error messages, cycle finish, cycle start, and right vs. left lens. Because of this design, it is possible for one small robot to feed two edging machines or, using the same configuration, have a large robot feed ten edging machines. This flexibility allows for easy adaptation of new device technology without having to buy a new robot as new technology emerges. Also, the communication scheme described increases communication speed and productivity in an ophthalmic lens manufacturing cell. In a preferred embodiment of the present invention, one robot serves six edging machines using the communications scheme described above. However, as those in the art will appreciate, any number of edging machines can be accommodated with such a communications scheme. Also, it will be appreciated that the communication scheme described herein can be used with a multitude of devices, and is not limited to edging machines.

Figure 4:
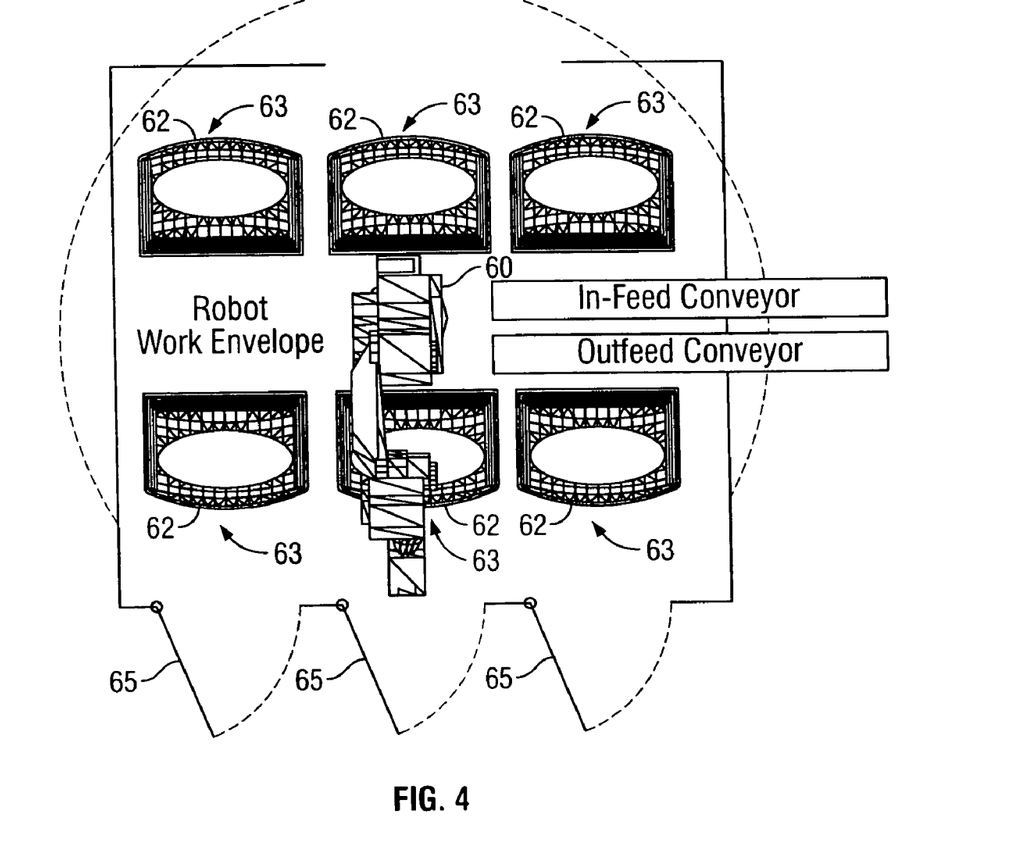
FIG. 4. is a top schematic view of a ophthalmic lens manufacturing cell layout.

Another embodiment of the present invention includes a ophthalmic lens manufacturing cell layout that provides for easier access to the edgers by a lab technician or other user in the event that a lens gets jammed in an edging machine or if other service of an edging machine become necessary. This layout, as shown in FIG. 4, provides a robotic arm 60 in the center of six edging machines 62. It will be noted, however, that any number of robots and/or edgers can be used in the practice of this embodiment of the present invention. Instead of the typical arrangement in which edgers are located with the openings of the edgers facing toward a robotic arm, this embodiment of the present invention has the edgers 62 located with the openings of the edgers 63 facing away from a robotic arm 60. It should be noted that the openings of the edgers need not necessarily face 180 degrees away from the robotic arm, but can be at any orientation whereby the openings of the edgers do not point at the robotic arm. The configuration of the openings of the edgers facing away from the robotic arm allows for a lab technician or other operator to easily access the opening of an edger, though, for example, access doors 65 (which are part of an enclosure for the cell) for service or to clear a jam. However, due to the fact that the robotic arm must reach over an edger to access the opening of the edger, a slightly more complex programming scheme must be employed. In other words, more instructions must be programmed into the robotic arm using techniques commonly known in the art. Also, it is preferred that the robotic arm have six or more axes in order to allow for a greater versatility and maneuverability of the robotic arm. However, as those skilled in the art will appreciate, robotic arms of greater or fewer axes can be used in the practice of the present invention.

Figure 5:
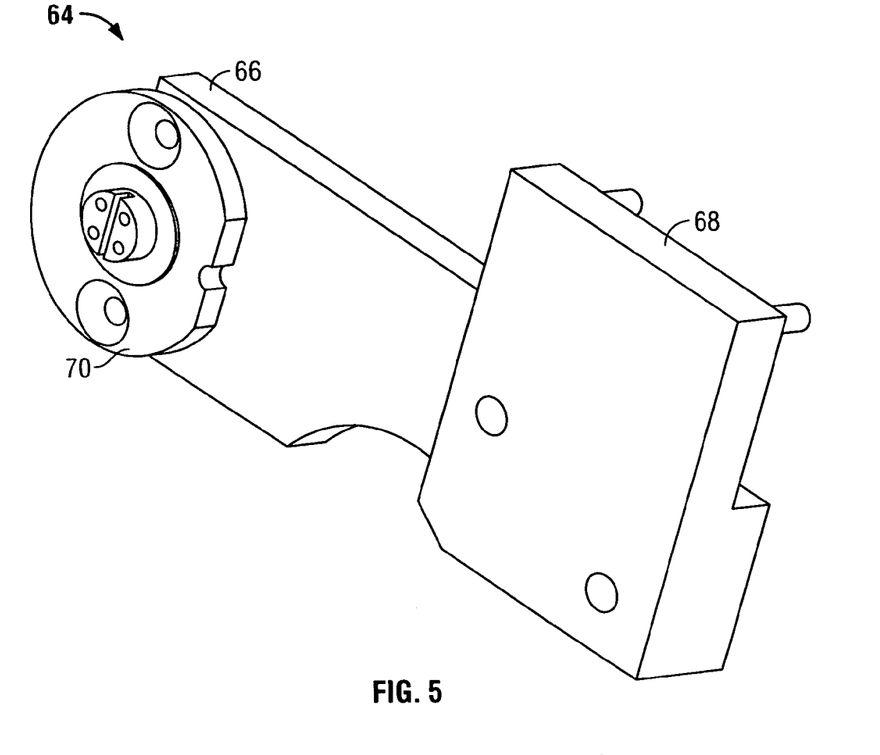
FIG. 5 is a left side perspective view of a training tool for use with one embodiment of the present invention.
Figure 6:
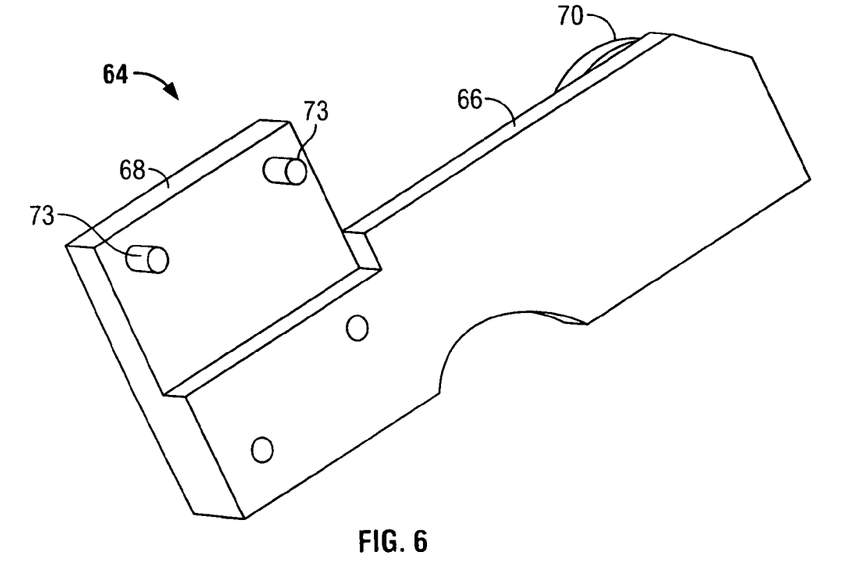
FIG. 6 is a right side perspective view of the training tool of FIG. 5.
Figure 7:
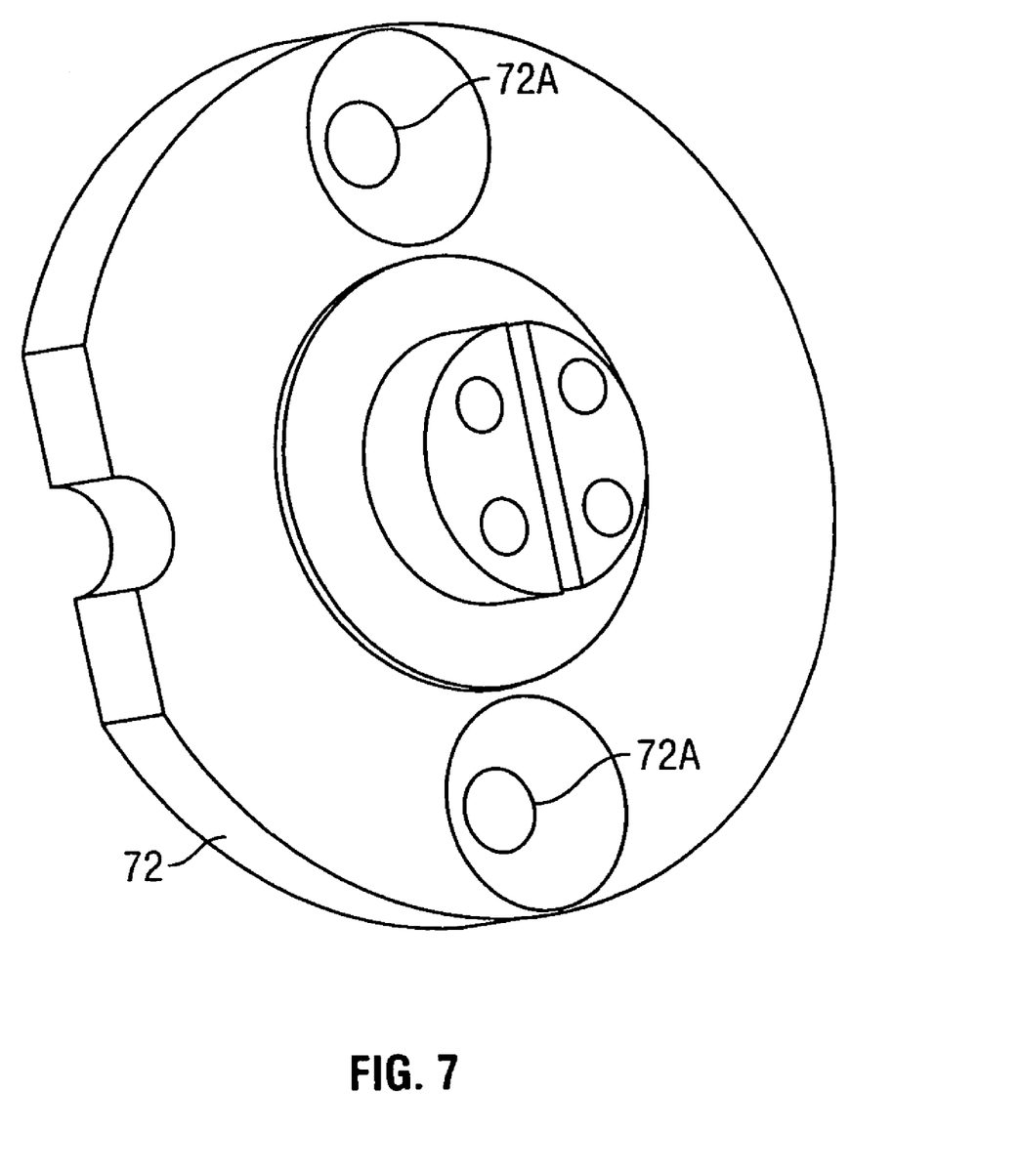
FIG. 7 is a perspective view of an engaging member for use with the training tool of FIG. 5.

In order to facilitate the programming of the robotic arm, a training tool 64, depicted in FIGS. 5–7 is used. The training tool 64 comprises a first end 66 and a second end 68. First end 66 is designed to engage, via engaging member 70, with a chuck of an edging machine in the same manner in which an edging machine would engage with a lens that has been blocked (i.e., via interlocking teeth, as is known in the art). Second end 68 contains a removable second engaging member 72 (FIG. 7), which is offset from engaging member 70 and is designed to mate with the robotic arm in the same manner that the robotic arm would engage with an ophthalmic lens (i.e., via suction grippers). Engaging member 72 connects to the second end 68 via pins 73 (FIG. 6). As can be appreciated, when a robotic arm is engaged with engaging member 72, it is in angular alignment with the fixed chuck within an edging machine, thus orientating the robot (and its associated tool) in the same angular position that it would be when actually placing a lens in an edging machine during production operations. Once this position is programmed into the robotic arm, it simplifies the remaining programming steps, in that the guess work associated with trying to rotationally align the robotic arm to the chuck within an edger is obviated In practice, to use the training arm, an operator will first insert the first end 66 of the training tool into an edging machine and manually actuate the edging machine so that the lens holding mechanism in the edging machine will mate with engaging member 70. Once this step is completed the operator can release the training tool and it will be supported substantially by the lens holding mechanism within the edging machine. Next, the operator attaches engaging member 72 (in a detached state from training tool 64) to the robotic arm and then maneuvers the robotic arm until the apertures 72A in the engaging member 72 are aligned with and fully engaged with the pins 73 on second end 68 of the training tool, thereby setting the rotational coordinates of the robotic arm's position identical to the orientation in which the robotic arm will be when placing a lens within an edging machine during production operations.

Figure 8:
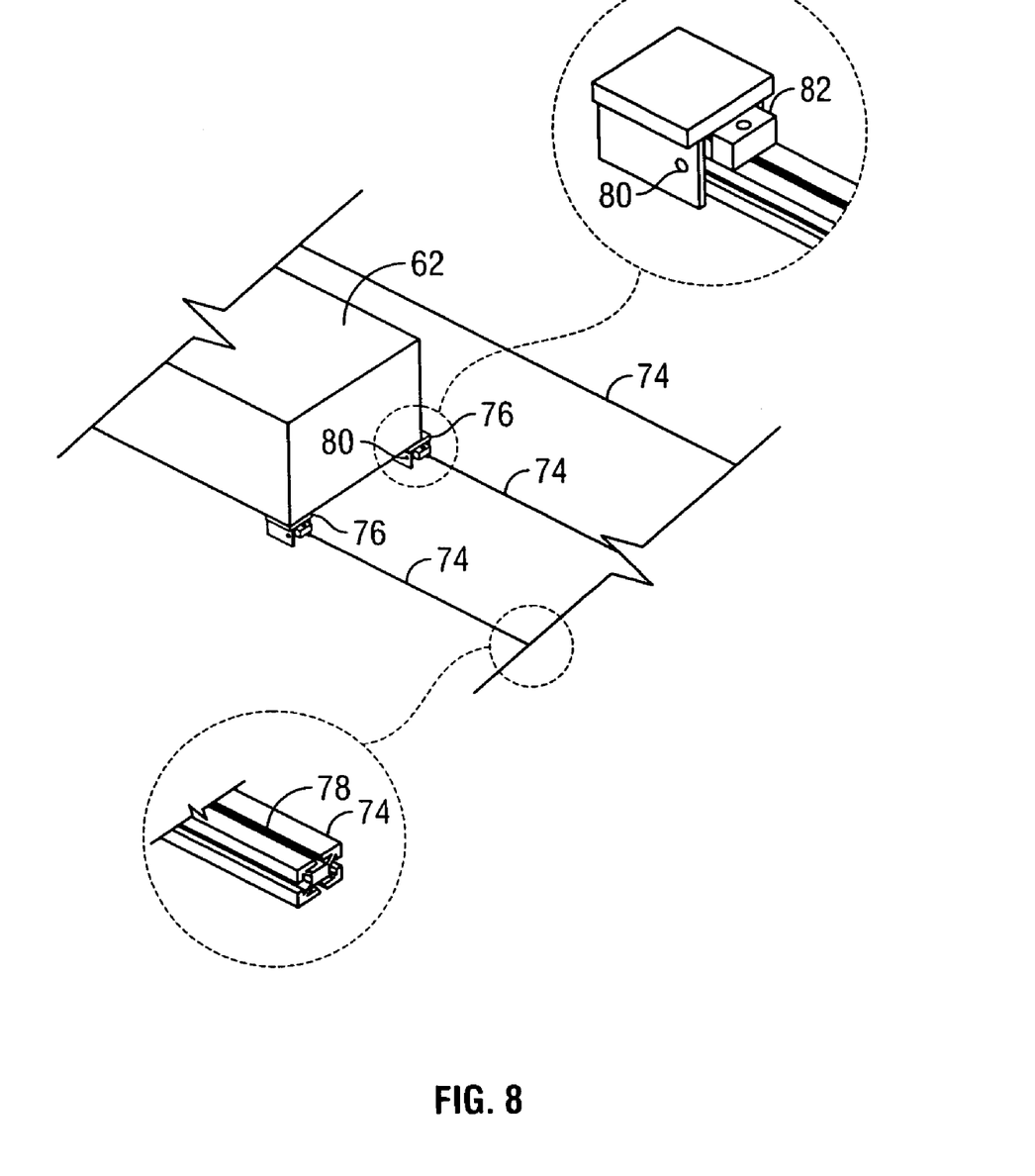
FIG. 8 is a perspective view of an ophthalmic lens manufacturing cell showing a simplified arrangement for holding an edging machine within the manufacturing cell.

Another embodiment of the present invention provides a structure for mounting edgers within an ophthalmic manufacturing cell that allows for easier removal and insertion of an edging machine. In this embodiment of the present invention, the edgers are mounted upon extruded aluminum rails, shown as reference numbers 74 in FIG. 8. In particular, the edgers 62 contain mounting brackets 76 which straddle rails 74 and are secured within grooves 78 by at least two set screws 80 on either side of the brackets 76. Also, once the edger is in the appropriate location within the ophthalmic manufacturing cell, a locking clamp 82 is used to further lock the edger's mounting bracket, thereby providing a secure attachment means for the edgers. In the preferred embodiment of the present invention, 80/20 metric locking clamps are used with each edging machine. However, as those with skill in the art will appreciate, a greater or lesser number of locking clamps and/or set screws can be used with this embodiment of the present invention and different types of clamping structures can be used with this embodiment of the present invention. If an individual edger needs to be replaced or serviced, an operator can easily loosen the locking clamp 82 and slide the edger out of the ophthalmic manufacturing cell along rails 74. Likewise, to insert a new edger, an operator need only align the mounting brackets 76 with the rails 74 and then slide the edger to the appropriate location within the ophthalmic manufacturing cell.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A tool for gripping ophthalmic lenses comprising:
   at least one gripper:
   a shaft associated with said gripper, said shaft having two ends and being slidably attached at one end thereof to a support structure
   a resilient member which biases said gripper in a direction away from said support structure:
   a locking member which locks said shaft in a desired position during a lens gripping operation, wherein the other end of said shaft is connected to a connecting plate and wherein said gripper is attached to said connecting plate.

2. The tool of claim 1, wherein the longitudinal axes of the gripper and the shaft are offset.

3. A tool for gripping ophthalmic lenses comprising:
   at least one gripper:
   a shaft associated with said gripper, said shaft having two ends and being slidably attached at one end thereof to a support structure
   a resilient member which biases said gripper in a direction away from said support structure;
   a locking member which locks said shaft in a desired position during a lens gripping operation, wherein said resilient member is a spring and wherein said spring is connected between said support structure and a connecting plate.

4. The tool of claim 3, wherein the other end of said shaft is connected to a connecting plate and wherein said gripper is attached to said connecting plate.

5. A tool for gripping ophthalmic lenses comprising:
   at least one gripper;
   a shaft associated with said gripper, said shaft having two ends and being slidably attached at one end thereof to a support structure
   a resilient member which biases said gripper in a direction away from said support structure;
   a locking member which locks said shaft in a desired position during a lens gripping operation. wherein said tool is connected to a six axis robotic arm.

6. A tool for gripping ophthalmic lenses comprising:
   a base;
   a plurality of extension arms connected to said base;
   a vacuum gripper base plate connected to said extension arms;
   a shaft slideably connected to said vacuum gripper base plate at one end and fixably connected to a connecting plate at another end;
   a resilient member attached between said gripper base plate and said connecting plate;
   a vacuum gripper attached to said connecting plate, such that the longitudinal axes of the vacuum gripper and the shaft are offset.

7. The tool of claim 6, wherein the resilient member is a spring.

8. The tool of claim 7, wherein the tool further comprises a locking member comprising a piston and cylinder, wherein the locking member locks the shaft in a desired position during a lens gripping operation.

9. The tool of claim 8, wherein the locking member further comprises a friction pad attached to said piston and wherein said friction pad engages a flat portion of the cylinder during a lens gripping operation.

10. The tool of claim 6, wherein said tool is connected to a six axis robotic arm.

11. A lens hold down mechanism comprising:
    a support member;
    at least one shaft slidably connected to said support member;
    a resilient member which biases said shaft in a downward direction;
    a lens contact member attached to said shaft;
    a robotic arm connected to said support member, wherein when said robot moves in a downward direction to pick up a lens tray, said lens contact member will contact lenses in said tray and cause said shaft to move upwardly with respect to said support member, and wherein said resilient member maintains a pressure on said lens in said lens tray.

12. The lens hold down mechanism of claim 11, wherein said resilient member is a spring.

13. The lens hold down mechanism of claim 11, wherein said support member is attached to a lens gripper tool.

14. An arrangement for holding an ophthalmic edging machine within an ophthalmic manufacturing cell comprising:
    an ophthalmic edging machine;
    at least two rails, wherein said edging machine includes a bracket that engages said rails; and
    a locking mechanism, wherein said locking mechanism holds said ophthalmic edging machine in a desired position along said rails, wherein said rails contain at least one groove and wherein said locking member engages said at least one groove to lock said ophthalmic edging machine in place.

15. An arrangement for holding an ophthalmic edging machine with in an ophthalmic manufacturing cell comprising:
   an ophthalmic edging machine;
   at least two rails, wherein said edging machine includes a bracket that engages said rails; and
   a locking mechanism, wherein said locking mechanism holds said ophthalmic edging machine in a desired position along said rails, wherein said bracket straddles said rails and wherein said bracket includes set screws that engage with second and third grooves on said rails.

16. An arrangement for holding an ophthalmic edging machine; within an ophthalmic manufacturing cell comprising:
   an ophthalmic edging machine:
   at least two rails, wherein said edging machine includes a bracket that engages said rails; and
   a locking mechanism, wherein said locking mechanism holds said ophthalmic edging machine in a desired position along said rails wherein said rails contain at least one groove and wherein each rail has a locking member to lock said ophthalmic edging machine in place.

* * * * *